Figure 1:
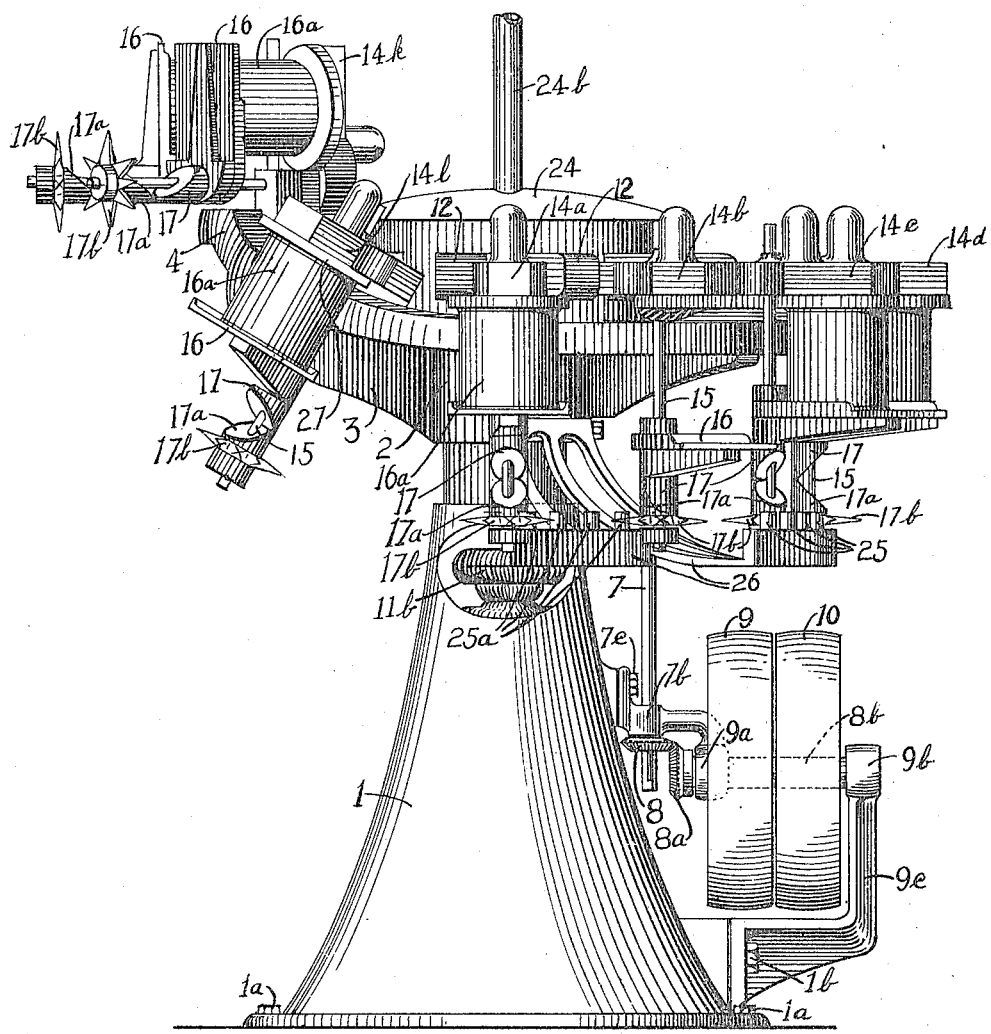

E. J. ENGELHARDT.
MACHINE FOR SYRUPING FRUIT IN CANS.
APPLICATION FILED DEC. 23, 1913.

1,135,102.

Patented Apr. 13, 1915.
5 SHEETS—SHEET 1.

WITNESSES:

INVENTOR
Edward Joseph Engelhardt
BY
HIS ATTORNEY

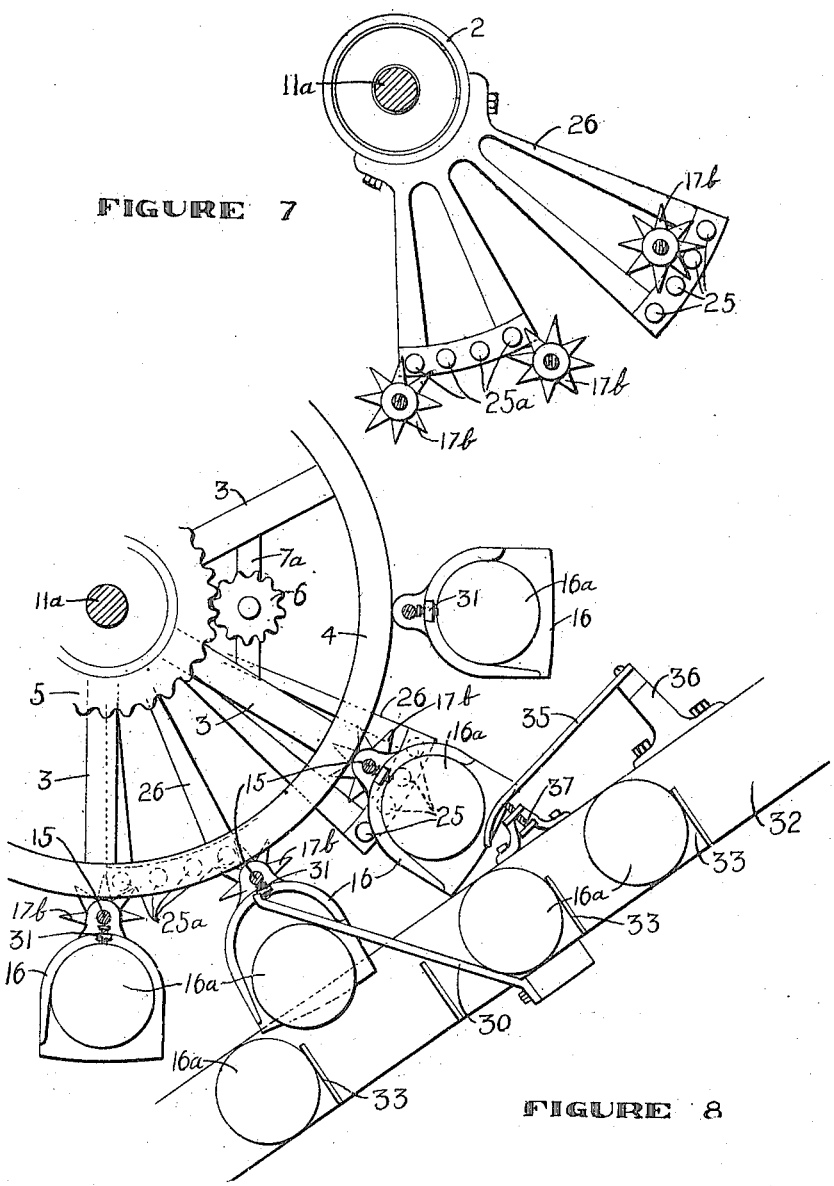

E. J. ENGELHARDT.
MACHINE FOR SYRUPING FRUIT IN CANS.
APPLICATION FILED DEC. 23, 1913.

UNITED STATES PATENT OFFICE.

EDWARD JOSEPH ENGELHARDT, OF SAN JOSE, CALIFORNIA.

MACHINE FOR SYRUPING FRUIT IN CANS.

1,135,102.  Specification of Letters Patent.  Patented Apr. 13, 1915.

Application filed December 23, 1913. Serial No. 808,435.

*To all whom it may concern:*

Be it known that I, EDWARD JOSEPH ENGELHARDT, a citizen of the United States, residing at 450 West Santa Clara street, in the city of San Jose, county of Santa Clara, and State of California, have invented certain new and useful Improvements in Machines for Syruping Fruit in Cans.

The hereinafter described syruping machine is designed for use in connection with fruit canning factories generally for supplying the filled cans or packages with the syrup or liquid to be placed therein, although its use is not restricted to the syruping of filled cans or packages; the object of my invention being the production of a simple, effective, durable, and automatic machine for the desired purposes.

Another object of my invention is to provide a machine for the purpose of filling the cans after the same have been filled with fruit or vegetables, to the proper amount of syrup or liquid required, before passing the cans to the processor or cooker preparatory to sealing.

Another object of my invention is to provide a machine simple of construction, of few parts, and of easy access for cleaning, economical of operation both as to the power required and in the prevention of wasting of the syrup or liquid being used.

Another and special object of my invention is that the syrup or liquid is conveyed to the cans through the working parts of the machine, said parts being so constructed as to render unlikely any excessive wear and obviate leaking which is so common to such machines using hose or pipes.

In my invention the cans are filled in a vertical position without the use of hose or pipes and then drained back to the amount desired in a horizontal position. The filling valve is opened by the clamping action without stress or friction on any part of the machine and the said cans are locked in position and released automatically. The required amount of syrup or liquid to remain in the can is accurately determined by the distance the can is placed inwardly or outwardly upon the clamping platform, thus changing the relative distance of the upper edge of the can when in draining position to the filling and draining part. The cans are clamped in position and with a rotating movement and released from said clamps by same device performing both operations by a reversal of motion.

Another object of my invention is to produce a syruping machine which will be extremely quick in operation and easy of adjustment to different heights of cans, and also to varying heights of feed and discharge and one in which the conveying devices will work automatically with the feed and discharge; and to improve generally the construction and operation of the several mechanisms entering into the formation of the machine as a whole.

My invention will be best understood from the consideration of the following detailed description, taken in connection with the accompanying drawings forming a part of this specification, and though the drawings show a practical embodiment of the invention, the latter may be otherwise embodied without sacrifice of any of the salient features of the invention.

To comprehend the invention, reference should be had to the accompanying sheets of drawings, wherein—

Figure 2:
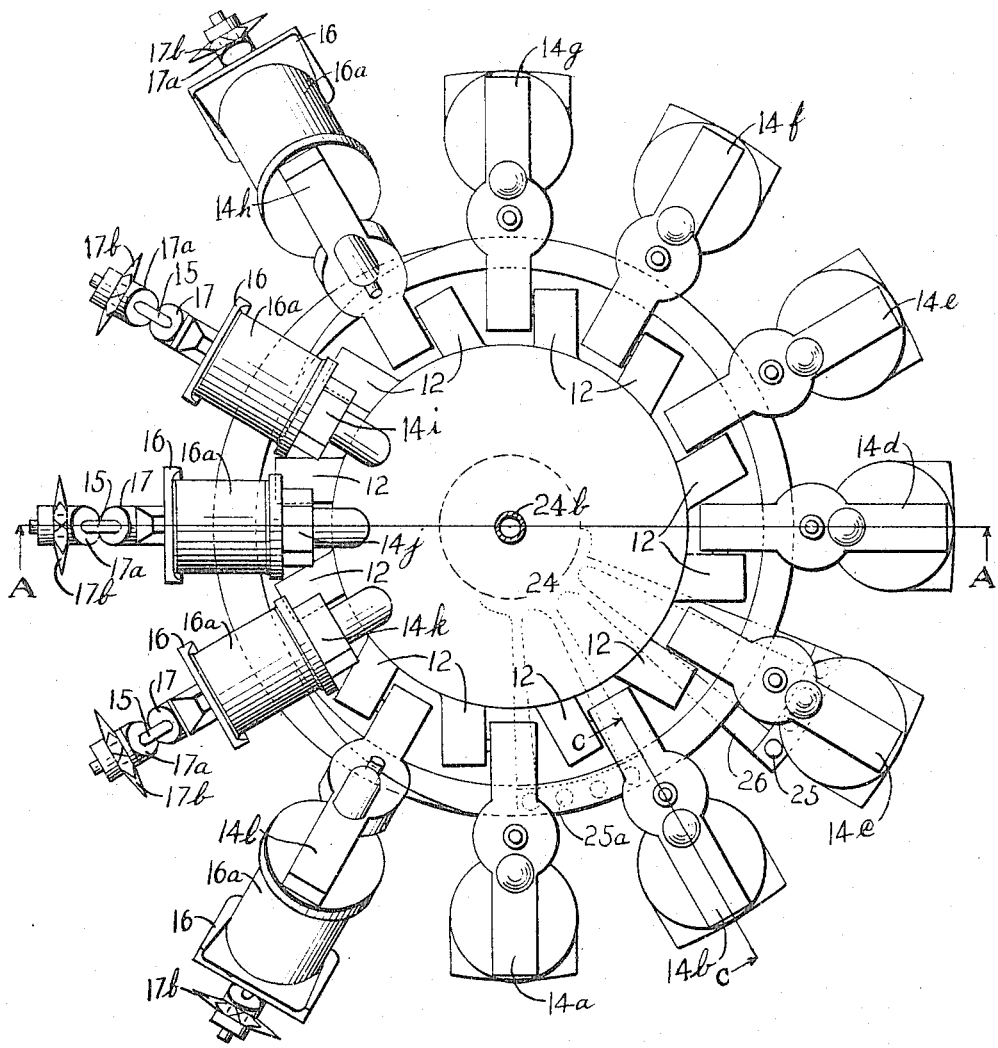
Figure 3:
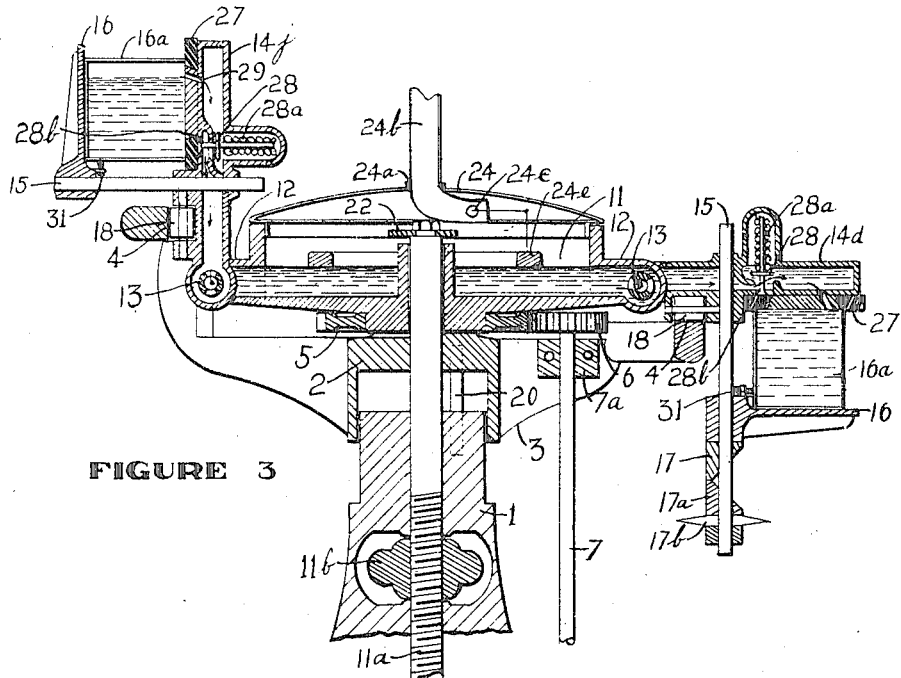
Figure 5:
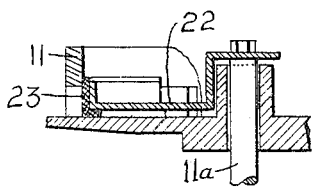
Figure 4:
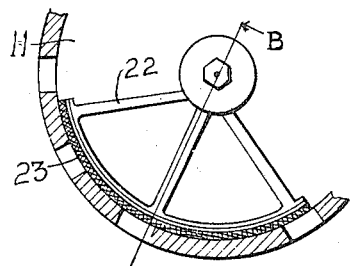
Figure 6:
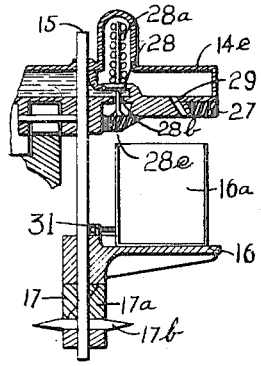
Figure 9:
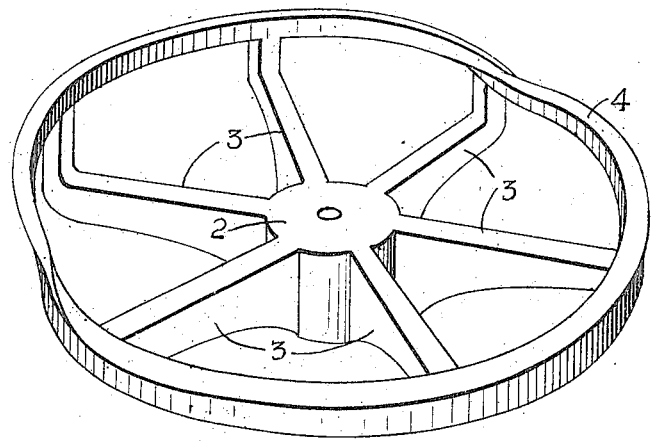
Figure 10:
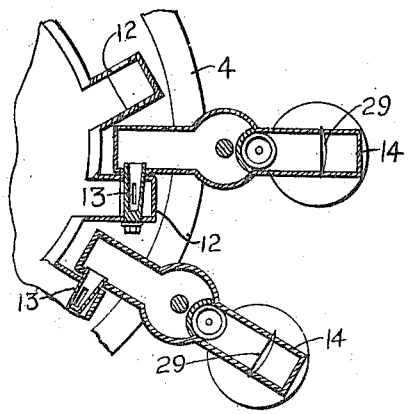
Figure 11:
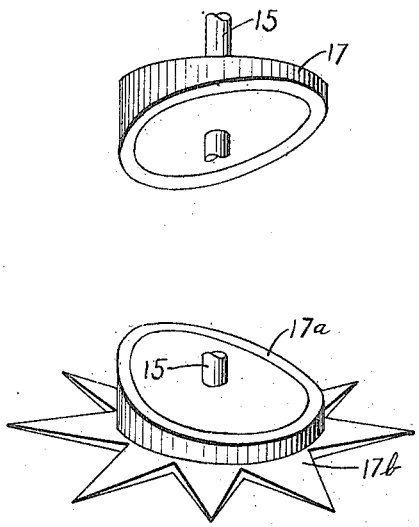

Figure 1 is a front elevation of my syruping machine. Fig. 2 is a plan view of the same. Fig. 3 is a cross section on line A—A of Fig. 2. Fig. 4 is a detail plan view of the angular arm cutoff in position. Fig. 5 is a sectional view on line B—B of Fig. 4. Fig. 6 is a sectional view on line C—C of Fig. 2. Fig. 7 is a plan view of the bracket and pins in position with star-wheels connecting thereto. Fig. 8 is a plan view of a portion of the machine showing the feed and discharge mechanism and can adjusting device. Fig. 9 is a perspective view of the circular twisting track. Fig. 10 is a horizontal section through the hollow arms and connections, parts being broken away. Fig. 11 is a perspective view of the upper and lower cams and star-wheel, parts being broken away.

Similar characters of reference indicate similar parts throughout the several views.

Referring to the drawings, the pedestal 1 is of any desirable form and supported upon any ordinary foundation by bolts shown at 1ª. At the top thereof is mounted an adjustable cap 2, which has a sleeve extending downwardly over the top of said frame, as a guide thereon. From this cap 2 project arms 3, which support the circular twisting track 4. Upon this cap 2 revolve the princidriven by gear 5, which is actuated by pinion gear 6 which is keyed to the upper end of shaft 7, said shaft being held in place at the upper end thereof by a bearing $7^a$ attached to one of the arms 3. Said shaft 7 extends down a distance and is held in place by a bearing $7^b$, said bearing being bolted to frame 1 by bolts shown at $7^c$. At the lower end of shaft 7 is bevel-gear 8 which comes in contact with bevel-gear $8^a$, said gear being keyed to the end of shaft $8^b$, said shaft being supported by bearings $9^a$ and $9^b$. Said bearing $9^b$ is supported by iron bracket $9^c$, said bracket being held in place on frame 1 by bolts shown at $1^b$. On shaft $8^b$ is keyed pulley 9 which is the driving pulley. Along side of said pulley 9 is loose pulley 10. By shifting the power belt from one pulley to the other the power is applied to the machine or taken off as required. The syrup or liquid reservoir 11 is attached to gear 5 and revolves therewith on shaft $11^a$, said shaft being fastened to cap 2 and extending down a distance through adjustable cap 2 and into pedestal 1 having its lower end threaded to which is attached adjustable nut $11^b$, which is for the purpose of elevating or lowering the cap 2 and the parts operating thereon so that the same may be adapted to the height of the feeding and discharge mechanisms. From the periphery of reservoir 11 project a plurality of hollow arms 12 to which are hinged by means of a hollow spindle 13 a plurality of hollow arms $14^a$ to $14^l$ inclusive. From the hollow arms $14^a$ to $14^l$ inclusive are suspended by means of shafts 15 the can-supports 16 together with star-wheels $17^b$ operating cams 17 and $17^a$. Keyed to cam $17^a$ are said star-wheels $17^b$, said cams $17^a$ being revoluble on shafts 15. Upon the under side of arms $14^a$ to $14^l$ inclusive are placed rollers 18 which travel on a circular twisting track 4, the same supporting and guiding arms $14^a$ to $14^l$ inclusive with their attachments and loads in their travel around the machine and to the assumption of their various positions. The cap 2 with arms 3 supporting the track 4 is keyed to the shaft $11^a$ and as a further stay against a rotating strain a sliding pin 20 is secured in the cap and projects downwardly into the head of pedestal 1, the fit being such as to permit the raising of the top of the machine for adjustment as hereinafter described. From the top of shaft $11^a$ are rigidly secured arms 22 the same being faced on their outer and lower surface with a packing material 23, this device acting as a cutoff of the flow of liquid from the several openings in arms 12 at such time of operation that the cans are being released from the clamps and removed from the machine and replaced with other cans. The angular arms 22 standing in a fixed position close and open the openings in arms 12 by reason of the rotation of the reservoir 11 bringing those openings successively opposite its surface. A cover 24 is placed over the reservoir 11 to protect the contents from dust. This cover is provided with an opening at $24^a$ for the purpose of inserting therein a supply pipe $24^b$, said pipe having a valve $24^c$ which is operated by a float $24^e$. The lower part of the cam $17^a$ is provided with a star-wheel $17^b$ which in the rotation of the machine causes the wheel to travel between the pins 25 and $25^a$ which are firmly set in the brackets 26 and $26^a$ respectively which are attached to cap 2. Assuming in this instance that the rotation is contra clock-wise, the star-wheel first engages the outer row of pins 25 which will have the effect of raising the cam 17 to the highest point, fastening the can-support 16 on the can $16^a$. When the cam 17 is raised to the highest point which has a level surface, it raises the can-support 16 with its can $16^a$ to contact with the under surface of hollow arm 14 which is provided with a rubber ring 27 which prevents leakage of the liquid in the various operations and positions. After the can $16^a$ has completed its revolution around the machine and is ready to be discharged, the star-wheel $17^b$ engages pins $25^a$ thus lowering cam 17 to its lowest point and permitting the can $16^a$ to drop downward free of the hollow arm 14, when the can $16^a$ is removed from the machine by arm shown at 30. Closely following this action a fresh can is placed upon the vacant can-support 16 and the star-wheel $17^b$ immediately engages the pins 25 and the operation is repeated. The clamping action described opens the valve 28 by bringing the rubber ring 27 in contact with the lower end of said valve stem and raising the valve 28 from its seat allowing the liquid to flow into the can $16^a$ through port 29. Said valve 28 is closed by the action of spring $28^a$. At the lower end of said valve stem is shown a packing nut $28^b$ for the purpose of preventing leakage at this point when said valve 28 is closed down and no can in position. When a fresh can is inserted and clamped in place the rim of said can forces the rubber ring 27 back into position raising the valve 28 by means of the upward pressure on flange $28^c$ on the end of said valve stem 28. This position is maintained during the process of filling and draining and is reversed and closed as heretofore described. When the can is drained and about to descend circular twisted track 4 to a vertical position, the opening from supply tank 11 to hollow arm 12 is closed by a cut-off 22—23 and remains closed by said cut-off 22—23 until said can is removed and valve 28 allowed to close.

In Fig. 2 arms $14^a$—$^b$—$^c$—$^d$—$^e$—$^f$ and $^g$ are shown in vertical position with the cans $16^a$ attached thereto. Arm $14^h$ is shown mounting the circular twisted track 4, gradually taking a horizontal position for draining. Arm 14¹ is shown descending the circular twisted track 4 to a point where the can 16ª is unlocked and released. An adjustable stop 31 is placed upon the plane of the can-support 16 for the purpose of adjusting the distance that the can shall be placed upon the same. This distance is governed by the quantity of liquid desired to remain in the can and is accomplished as follows:— An opening 29 is shown through which the liquid flows to and from the can. It is assumed that the cans are fully filled with liquid during the progress of positions as 14ª—ᵇ—ᶜ—ᵈ—ᵉ—ᶠ and ᵍ. When the can is shifted to positions as 14ⁱ—ʲ and ᵏ the liquid drains back into reservoir 11, the spindle 13 remaining open in all positions. The amount of liquid to remain in the can may be accurately determined by the adjusting stop 31 heretofore described. The feeding and releasing device is shown as a traveling track 32 having a plurality of angle bars 33. The cans 16ª are placed on this traveling track 32 and in front of angle bars 33. As the cans advance they come in contact with diagonal arm 30 and by this means are carried onto can-support 16. As this can-support advances the can 16ª comes in contact with adjustable arm 35 which places the can in the required position on platform 16. Adjustable arm 35 is held in place by stanchion 36 and has an adjustable screw shown at 37. This screw is for the purpose of adjusting the lower end of arm 35 in or out as to the required position of the can 16ª on can-support 16. In removing the cans 16ª from the can-support 16 after the same have been filled and drained, the same come in contact with diagonal arm 30 and is thus removed from can-support 16 onto traveling track 32 from which the cans 16ª are taken to a processor or cooker preparatory to sealing.

I am aware that various modifications may be made in the construction of the working parts of the herein described machine without departing from the involved invention, which resides in rotatable means for successfully receiving cans to be filled with syrup or other liquid, automatically clamping the said cans in position, filling the same with syrup or other liquid and draining them back to the amount required to be left in the can during the rotary travel of the clamping and sustaining mechanism, and successively discharging the filled cans from the machine, and in the means thrown into action by the movement of a received can for shifting the device for unseating the valves controlling the outflow of syrup or liquid from the revolving syrup reservoir, whereby the machine is of such a construction as to cover the mechanism of "no can, no syrup."

Having thus described my invention what I claim as new and desire to secure by Letters Patent is—

1. In a machine for syruping fruit in cans, the combination of an endless track in which the wearing surface alternately assumes a horizontal and vertical position with means for supporting the same, a reservoir concentrically and revolubly mounted in said track with driving mechanism operatively connected thereto, a plurality of hollow arms radially positioned about the perimeter thereof and communicating therewith, a hollow arm pivotally attached to each of said last mentioned hollow arms and communicating therewith, said pivotally attached hollow arms being provided with filling nozzles and with rollers adapted to travel on said track when said reservoir is set in motion and having can supports depending therefrom.

2. In a machine for syruping fruit in cans, the combination of an endless track in which the wearing surface alternately assumes a horizontal and vertical position with means for supporting the same, a reservoir concentrically and revolubly mounted in said track with driving mechanism operatively connected thereto, a plurality of hollow arms radially positioned about the perimeter thereof and communicating therewith, a hollow arm pivotally attached to each of said last mentioned hollow arms and communicating therewith, said pivotally attached hollow arms being provided with filling nozzles and with rollers adapted to travel on said track when said reservoir is set in motion and having vertically movable can supports depending therefrom, valves operatively positioned therein adapted to open and close when cans are moved into and out of engagement with said filling nozzles, means for raising and lowering said can supports a distance at predetermined intervals and holding the same in said raised or lowered position, substantially as shown and described.

3. In a machine for syruping fruit in cans, the combination of an endless track in which the wearing surface alternately assumes a horizontal and vertical position with means for supporting the same, a reservoir concentrically and revolubly mounted in said track with driving mechanism operatively connected thereto, a plurality of hollow arms radially positioned about the perimeter thereof and communicating therewith, a hollow arm pivotally attached to each of said last mentioned hollow arms and communicating therewith, said pivotally attached hollow arms being provided with filling nozzles and with rollers adapted to travel on said track when said reservoir is set in motion and having vertically movable can supports depending therefrom, valves operatively positioned therein adapted to open and close when cans are moved into and out of engagement with said filling nozzles, means for raising and lowering said can supports a distance at predetermined intervals and holding the same in said raised or lowered positions, a supply pipe discharging into said reservoir having a float controlled valve positioned therein, means for automatically interrupting the communication between said reservoir and each of said radially positioned hollow arms during the period in which the can being filled passes from the draining position to its discharge, means for positioning cans the desired distance on said can supports, and means for removing said cans from said can supports after draining and releasing the same, substantially as shown and described.

In testimony whereof I have signed my name to this specification in the presence of two subscribing witnesses.

EDWARD JOSEPH ENGELHARDT.

Witnesses:
JOHN A. NAISMITH,
J. B. CAMBERS.